United States Patent
Bornea et al.

(10) Patent No.: US 10,360,262 B2
(45) Date of Patent: *Jul. 23, 2019

(54) OPTIMIZING SPARSE SCHEMA-LESS DATA IN DATA STORES

(71) Applicant: International Business Machines Corporation, Armonk, NY (US)

(72) Inventors: Mihaela Ancuta Bornea, White Plains, NY (US); Julian Dolby, Bronx, NY (US); Achille Belly Fokoue-Nkoutche, White Plains, NY (US); Anastasios Kementsietsidis, Markham (CA); Kavitha Srinivas, Rye, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,550

(22) Filed: Jun. 23, 2017

(65) Prior Publication Data

US 2017/0286566 A1 Oct. 5, 2017

Related U.S. Application Data

(63) Continuation of application No. 13/929,129, filed on Jun. 27, 2013, now Pat. No. 9,715,560, which is a
(Continued)

(51) Int. Cl.
*G06F 16/21* (2019.01)
*G06F 16/901* (2019.01)

(52) U.S. Cl.
CPC ........ *G06F 16/9024* (2019.01); *G06F 16/211* (2019.01)

(58) Field of Classification Search
CPC ............. G06F 17/30958; G06F 16/211; G06F 16/9024
See application file for complete search history.

(56) References Cited

U.S. PATENT DOCUMENTS 6,665,677 B1 * 12/2003 Wotring ............ G06F 17/30569
7,979,455 B2 7/2011 Krishnamoorthy et al.
(Continued)

OTHER PUBLICATIONS

Lv, et al., "Research and Implementation of the SPARQL-TO-SQL Query Translation Based on Restrict RDF View," 2010 International Conference on Web Information Systems and Mining.
(Continued)

*Primary Examiner* — Cam Y T Truong
(74) *Attorney, Agent, or Firm* — Fleit Gibbons Gutman Bongini Bianco PL; Thomas S. Grzesik

(57) ABSTRACT

Various embodiments of the invention relate to optimizing storage of schema-less data. At least one of a schema-less dataset including a plurality of resources one or more query workloads associated with the plurality of resources is received. Each resource is associated with at least a plurality of properties. At least one set of co-occurring properties from the plurality of properties is identified. A graph including a plurality of nodes is generated. Each of the nodes represents a unique property in the set of co-occurring properties. The graph further includes an edge connecting each node representing a pair of co-occurring properties. A schema is generated based on the graph that assigns a column identifier from a table to each unique property represented by one of the nodes in the graph.

19 Claims, 10 Drawing Sheets

Related U.S. Application Data continuation of application No. 13/454,559, filed on Apr. 24, 2012, now Pat. No. 8,918,434.

(56) References Cited

U.S. PATENT DOCUMENTS

| | | | |
|---|---|---|---|
| 7,987,179 | B2 | 7/2011 | Ma et al. |
| 8,032,525 | B2 | 10/2011 | Bowers et al. |
| 8,037,108 | B1 | 10/2011 | Chang |
| 2002/0120630 | A1* | 8/2002 | Christianson ..... G06F 17/30569 |
| 2003/0229639 | A1* | 12/2003 | Carlson ............. G06F 17/30474 |
| 2006/0106847 | A1* | 5/2006 | Eckardt, III ...... G06F 17/30696 |
| 2008/0243908 | A1 | 10/2008 | Aasman et al. |
| 2008/0320023 | A1* | 12/2008 | Fong ................... G06F 17/2264 |
| 2009/0222473 | A1* | 9/2009 | Chowdhury ...... G06F 17/30961 |
| 2010/0036862 | A1 | 2/2010 | Das et al. |

OTHER PUBLICATIONS

Borodaenko, "On-Demand RDF to Relational Query Translation in Samizdat RDF Store," IEEE International Conference on Intelligent Computing and Intelligent Systems, 2009.

Wang, et al., "Storing and Indexing RDF Data in a Column-Oriented DBMS<" 2nd International Workshop on Database Technology and Applications, 2010.

Lv, et al., "Selectivity Estimation of Correlated Properties in RDF Data for SPARQL Query Optimization," Fifth International Conference on Semantics, Knowledge and Grid, 2009.

Sun, et al., "Scalable RDF Store Based on HBase and MapReduce," 2010 3rd International Conference on Advanced Computer Theory and Engineering.

Frasincar, F., et al., "Adapting Graph Visualization Techniques for the Visualization of RDF Data." 2006.

Telea, A., et al., "Visualization of RDF(S)-based Information," Information Visualization, 2003. IV 2003. Proceedings. Seventh International Conference on Information Visualization (IV'03) 1093-9547/03, pp. 294-299, Jul. 16-18, 2003, Copyright 2003 IEEE.

Non-Final Office Action dated Mar. 25, 2013 for U.S. Appl. No. 13/454,559.

Final Office Action dated Jul. 25, 2013 for U.S. Appl. No. 13/454,559.

Non Final Office Action dated Apr. 11, 2014 received for U.S. Appl. No. 13/454,559.

Non-Final Office Action dated Nov. 18, 2016, received for U.S. Appl. No. 13/929,129.

\* cited by examiner

| PREDICATE | COLUMN ID | ... |
|---|---|---|
| P1 | COLUMN_A | ... |
| P2 | COLUMN_B | ... |
| P3 | COLUMN_C | ... |
| P4 | COLUMN_A | ... |
| P5 | COLUMN_B | ... |
| ... | ... | ... |

US 10,360,262 B2

OPTIMIZING SPARSE SCHEMA-LESS DATA IN DATA STORES

BACKGROUND

The present invention generally relates to data storage systems, and more particularly relates to optimizing schema-less data within data storage systems.

Storing schema-less (unstructured) data in relational databases is a difficult task, as this type of data tends to be sparse and generally requires a large number of tables/columns for storage. For example, consider storing extractions from an on-line encyclopedia using RDF (Resource Description Framework), which is one type of data that is sparse and schema less. This extraction can result in very large number (e.g., 39,000) of predicates such as the age of a person, the location of a company, etc. A large number of tables/columns would be required to store this large number of predicates. However, relational databases impose significant constraints on the size of various relational objects such as the size of a table, size of columns in a table, etc. Therefore, a single table may not be able to store all of the data and multiple tables generally cannot be used since schema-less data can have many thousands of types/entities.

BRIEF SUMMARY

In one embodiment a method for optimizing storage of schema-less data in a data storage system is disclosed. The method comprises receiving at least one of a schema-less dataset comprising a plurality of resources and one or more query workloads associated with the plurality of resources. Each resource in the plurality of resources is associated with at least a plurality of properties. At least one set of co-occurring properties from the plurality of properties is identified for one or more of the plurality of resources. A graph comprising a plurality of nodes is generated. Each of the plurality of nodes represents a unique property in the at least one set of co-occurring properties. The graph further comprises an edge connecting each of the plurality of nodes representing a pair of co-occurring properties in the at least one set of co-occurring properties. A schema is generated based on the graph that assigns a column identifier from a table to each unique property represented by one of the plurality of nodes in the graph, where each of the plurality of nodes connected by an edge is assigned the same column identifier.

In another embodiment a system for optimizing storage of schema-less data in a data storage system is disclosed. The system comprises memory and a processor that is communicatively coupled to the memory. A data optimizer is communicatively coupled to the memory and the processor. The data optimizer is configured to perform a method. The method comprises receiving at least one of a schema-less dataset comprising a plurality of resources and one or more query workloads associated with the plurality of resources. Each resource in the plurality of resources is associated with at least a plurality of properties. At least one set of co-occurring properties from the plurality of properties is identified for one or more of the plurality of resources. A graph comprising a plurality of nodes is generated. Each of the plurality of nodes represents a unique property in the at least one set of co-occurring properties. The graph further comprises an edge connecting each of the plurality of nodes representing a pair of co-occurring properties in the at least one set of co-occurring properties. A schema is generated based on the graph that assigns a column identifier from a table to each unique property represented by one of the plurality of nodes in the graph, where each of the plurality of nodes connected by an edge is assigned the same column identifier.

In yet another embodiment, a computer program product for optimizing storage of schema-less data in a data storage system is disclosed. The computer program product comprises a computer readable storage medium having computer readable program code embodied therewith is disclosed. The computer readable program code comprises computer readable program code configured to perform a method. The method comprises receiving at least one of a schema-less dataset comprising a plurality of resources and one or more query workloads associated with the plurality of resources. Each resource in the plurality of resources is associated with at least a plurality of properties. At least one set of co-occurring properties from the plurality of properties is identified for one or more of the plurality of resources. A graph comprising a plurality of nodes is generated. Each of the plurality of nodes represents a unique property in the at least one set of co-occurring properties. The graph further comprises an edge connecting each of the plurality of nodes representing a pair of co-occurring properties in the at least one set of co-occurring properties. A schema is generated based on the graph that assigns a column identifier from a table to each unique property represented by one of the plurality of nodes in the graph, where each of the plurality of nodes connected by an edge is assigned the same column identifier.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Operating Environment

Figure 1:
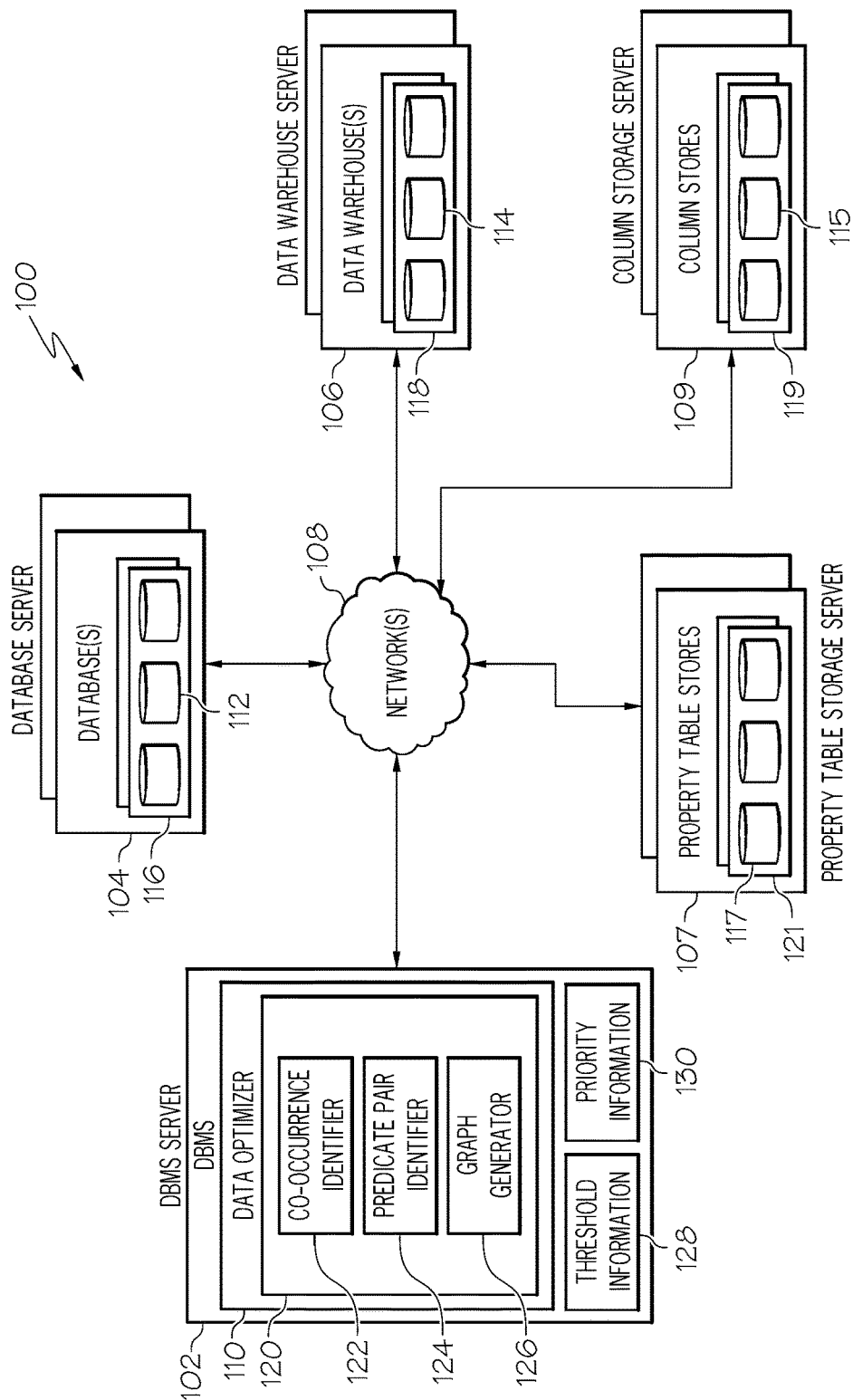
FIG. 1 is a block diagram illustrating one example of an operating environment according to one embodiment of the present invention.

FIG. 1 shows one example of an operating environment 100 applicable to various embodiments of the present invention. As shown, a graph server 102 is communicatively coupled to one or more data storage servers 104, 106, 107, 109 via a network(s) 108. A graph, in one embodiment, corresponds to a data structure that specifies edges between nodes. The edges are labeled, and they may or may not have a direction. It should be noted that in other embodiments the graph server 102 is a database management system (DBMS) server. The network(s) 108, in one embodiment, is a wide area network, local area network, wired network, wireless network, and/or the like. The graph server 102, in one embodiment, comprises a graph data manager 110. It should be noted that in an embodiment where the server 102 is a DBMS server the DBMS server comprises a DBMS instead or in addition to the graph data manager 110. The graph data manager 110 accesses and manages data 112, 114, 115, 117 stored in one or more databases 116, data warehouses 118, columns stores 119, and/or property table stores 121 residing on the data storage servers 104, 106, 107, 109. It should be noted that the databases 116 can also reside within the graph data manager 110 as well.

The databases 116, data warehouses 118, column stores 119, and property table stores 121 each comprise objects (not shown), which can be physical or logical, such as (but not limited to) storage containers, table spaces, tables, indexes, and materialized views for managing the data 112, 114, 115, 117. The data 112, 114, 115, 117 in one embodiment, is unstructured data (also referred to herein as "schema-less data") that is stored within the databases 116, data warehouses 118, column stores 119, and property table stores 121 without a scheme (i.e., there is no predefined schema). For example, in a traditional relational database, one knows that a table has columns, and one can technically map each row to an instance of a class. The class has well defined methods, and well defined attributes. In contrast, in a schema-less system, one does not know what data is associated to a given information, somewhat like having a database table with an arbitrary and non-predefined number of columns, and every row can have data in any number of these columns. Data 114 within a data warehouse 118 can also be considered unstructured or schema-less since a data warehouse combines disparate data from multiple databases.

In one embodiment, unstructured data that is to be stored within the database 114 is an RDF dataset. RDF can be used to represent both information extracted from unstructured data, such as with OpenCalais, as well as for information with a natural graph representation, such as DBPedia and UniProt. RDF can be used as a general method for conceptual description or model of information that is implemented in web resources, using a variety of syntax formats. RDF provides a way to express linked data: Subject-Property-Object (Value). As an example, "IBM hasLocation Hawthorne" can be expressed in RDF as a triple (IBM, hasLocation, Hawthorne). The subject denotes the resource, and the predicate (property) denotes traits or aspects of the resource and expresses a relationship between the subject and the object. It should be noted that, in the art, as well as in this description, the word "property" is sometimes used instead of "predicate", and an "object" is also sometimes alternatively referred to as the "data", "value", or "metadata" associated with a predicate and/or subject. An RDF database D is a set of triples of the form (subject, predicate, object), where the subject and predicate are drawn from a set R of resources. A resource is any entity that can be denoted by a Uniform Resource Identifier (URI). The object is either a resource or a primitive value such as an integer, string, floating-point number, etc.

It should be noted that embodiments of the present invention are not limited to RDF datasets. For example, a more generic schema-less data scheme would use tuples rather than the format based on triples such as demonstrated by the RDF scheme used to describe the method of the present invention. Thus, for example, a tuple will contain a subject that is then interrelated to other components defined in that tuple. Other schema-less data representations include, for example, key/value databases (e.g., CouchDB). Also, even though the following discussion uses RDF as one example of a dataset, the same discussion applies to schema-less data associated with a data warehouse as well. In addition, the various embodiments discussed herein are also applicable to query workloads. A query workload refers to a set of query templates that will be issued against the graph server 102.

Figures 2, 3:
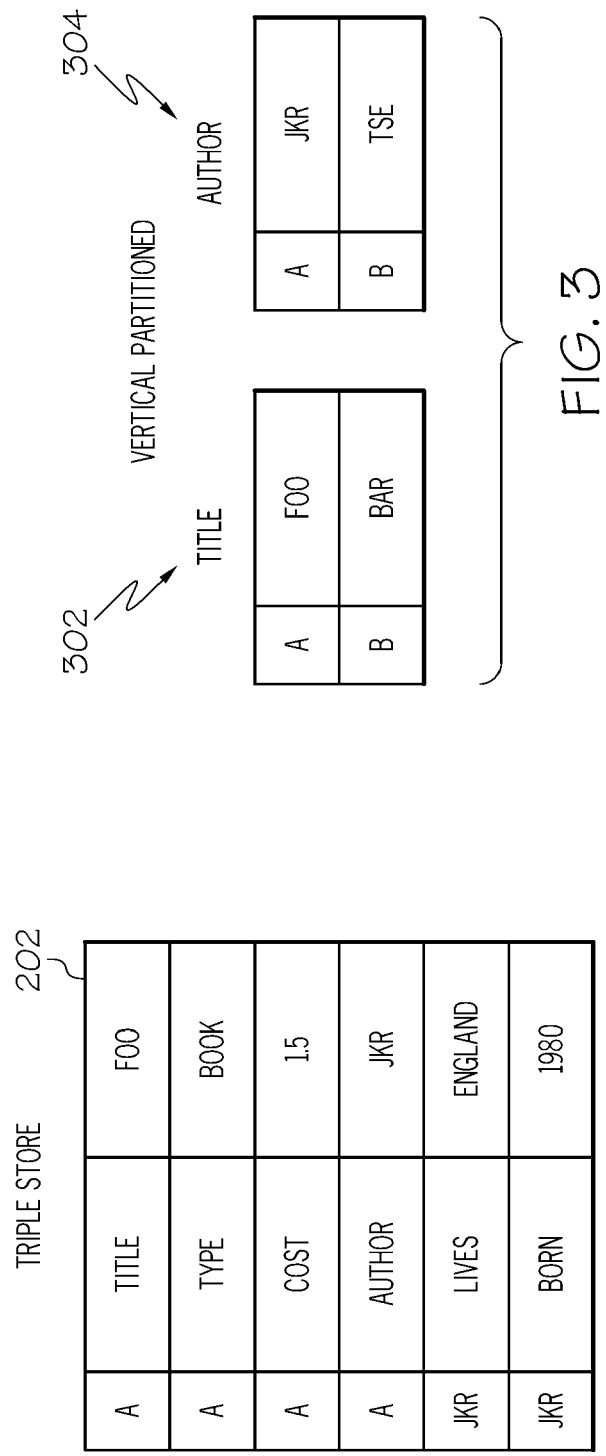
FIGS. 2-5 illustrate various examples of storage layouts according to one embodiment of the present invention.
Figures 4, 5:
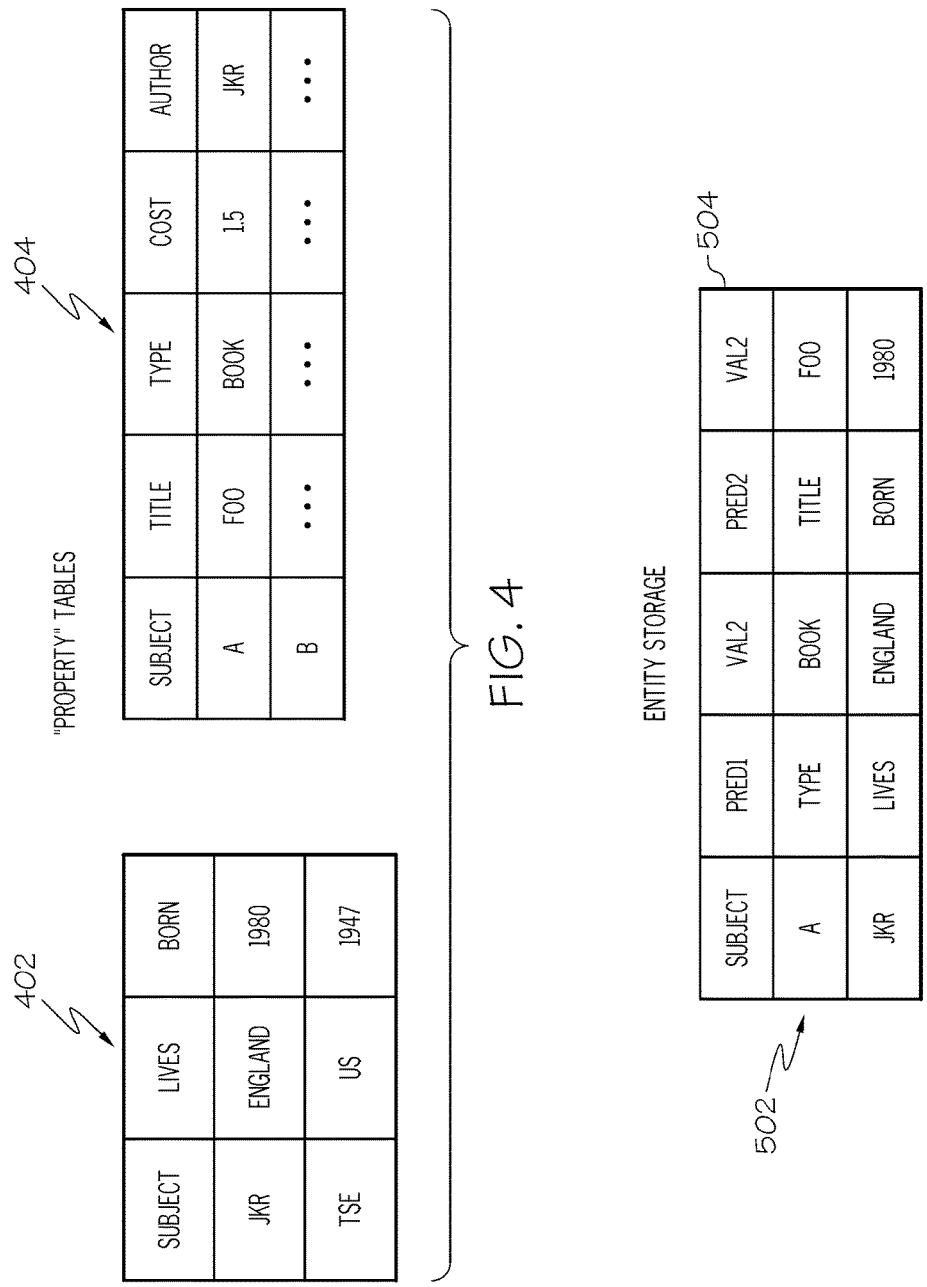

FIGS. 2-5 show various non-limiting examples of storage layouts for data that are applicable to one or more embodiments. The examples shown in FIGS. 2-5 are based on a graph comprising the following data: a title 'Foo'; a type Book; a cost 1.5; an author JKR; JKR lives England; and JKR born 1980. FIG. 2 shows a first example of a storage layout referred to a triple store. In a triple store, all information about a graph is stored in a single table 202, with source, target, and edge labels on each row 204. FIG. 3 shows a second example of a storage layout referred to as vertical partitioned store. In a vertical partitioned store, edge labels 302, 304 separate the graph. Each edge label 302, 304 is its own 'partition' where all values for a given edge type are stored in a so-called column file. FIG. 4 shows a third example of a storage layout referred to as a property table store. In a property table store graphs are stored by entity types. The observation is that the attributes of a book are different from the attributes of an author, so each has different clusters of properties that will be stored together in different tables 402, 404. FIG. 5 shows a fourth example of a storage layout referred to as an entity store. In an entity store, graphs are stored such that all information about an entity is placed into a single row 502 of a table 504 (if possible).

One problem with storing and organizing schema-less data within a database, data warehouse, column store, property table store, etc. is that a schema-less datasets can have many different types of entities and many different properties. For example, an RDF dataset can comprise over 12,000 entities with 39,000 different properties. These characteristics of schema-less data make determining how to store or re-organize information about a single subject in a single table a difficult, if not an impossible, task for conventional database management system. Therefore, the graph data manager 110, in one embodiment, comprises a data optimizer 120 for computing an optimal configuration/layout for storing information about a single subject or object (regardless of type) in a single table. The data optimization allows for schema-less data to be optimally store and processed in a custom storage scheme for a database 116, data warehouse 118, column store 119, property table store 121, and/or the like. The data optimizer 120, in this embodiment, comprises a co-occurrence identifier 122, a predicate-pair identifier 124, and a graph generator 126. The data optimizer 120, in one embodiment, utilizes threshold information 128 and/or priority information 130 when performing data optimization operations. In other embodiments, threshold information and/or priority information is not utilized. The data optimizer 120 and its components are discussed in greater detail below.

Schema-Less Data Optimization

As discussed above the data optimizer 120 of the graph data manager 110 allows for schema-less data to be optimally stored and processed within databases 116, data warehouses 118, column stores 119, property table stores 121, and/or the like. The data optimizer 120 determines the optimal number of columns and the optimal assignment of predicates to columns to allow a relational store to efficiently store and process schema-less data such as, but not limited to RDF triples. It should be noted that embodiments of the present invention are also applicable to other types of schema-less data, as expressed more generically in units of tuples rather than the triples used in the RDF format.

In one embodiment, the data optimizer 120 utilizes a table, referred to herein as a "hashtable", to store information about subjects or objects (regardless of type). The hashtable comprises rows each being dedicated to one subject in the data storage system. Predicates/objects of that subject will then be inserted pair-wise into columns of that subject's row. A key concern in designing the hashtable is the number of columns, since it presents an issue of efficiency, relative both to storage space utilization and to processing efficiency, including efficiency in retrieving rows of the table from disk memory for processing queries. For example, consider an RDF database with a dataset comprising 39,000 predicates. If the DBMS engine, for example, can only handle about 1012 columns for page sizes of 8 to 32 K, the above dataset could not be completely stored in a single hashtable. Also, each column would have approximately 39000/1012 predicates assigned to a single column, if predicates are assigned to columns independent of any knowledge of the dataset. As an example, take a dataset comprising two commonly occurring predicates P and Q such that each subject in the dataset has both properties. Suppose further that because the predicate to column assignments were done without knowledge of the structure of the data, both P and Q were assigned to the same column. Now to store the data in the database, every subject would need at least two rows. This would mean that any query which asks for the set of subjects who have both P and Q would need two joins.

Therefore, the data optimizer 120 identifies the optimal number of columns for storing predicates such that the number of columns is minimized to reduce space wastage while also eliminating spills into additional rows. Stated differently, the data optimizer 120 determines an assignment of columns to predicates while balancing the need to minimize the number of columns to conserve size and the number of spills into the next row to reduce the number of necessary joins. As will be discussed in greater detail below, the data optimizer 120 utilizes graph coloring techniques to identify the number of required columns by assigning co-occurring predicates into different columns, as much as possible.

Two predicates P and Q co-occur if a single subject has both P and Q. This co-occurrence information is given as input to a graph coloring algorithm of the data optimizer 120, which creates an interference edge for every pair of predicates that co-occur together. This graph coloring operating utilizes an optimal (e.g., minimal) number of columns to assign predicates to columns. However, if the structure of the dataset is such that this minimal number of columns is greater than the maximum number of columns in the database, certain predicate pair co-occurrences are ignored and accepted as pairs that produce spills. Predicate pairs can be ignored based on many different characteristics. For example, if a query workload is known, predicates that appear in queries can be given priority, and all other predicates can be ignored. Another option is to ignore predicate pairs that co-occur infrequently across subjects (e.g., the count for the co-occurrence of the predicate pair is low across all subjects). In eliminating predicate pairs from the graph based on any of these characteristics, the data optimizer 120 can take into account a minimal percentage of the data to be covered, so that as many predicate pairs can be considered as possible.

The data optimizer 120 obtains a set of unstructured data (e.g., RDF data), threshold information (e.g. the minimum percentage of data to be covered, and the maximum number of columns permitted in a database) 128, and optional priority information (e.g., predicates that occur in a query workload) 130 as inputs. The unstructured dataset can be an existing set of data within the database/warehouse 116, 118 or a new set of data to be stored/loaded into the database/warehouse 116, 118, as discussed above. Therefore, the data optimization process discussed below is applicable to re-organization of data already residing within a data storage system, and is also applicable to new data that is to be stored/loaded into a data storage system.

Figure 6:
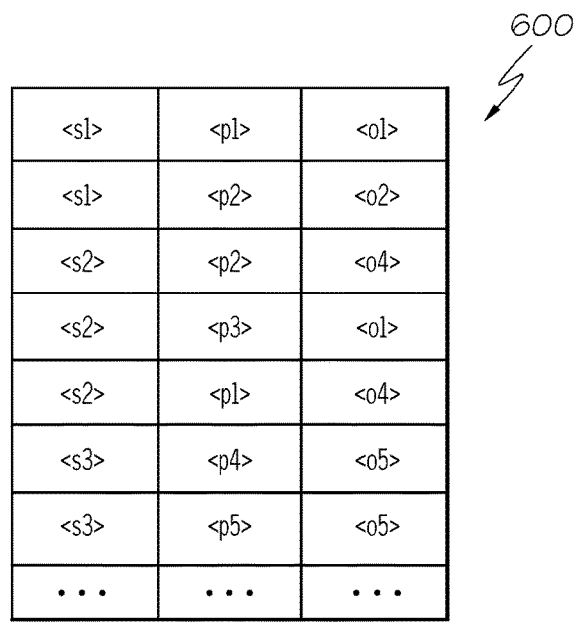
FIG. 6 illustrates one example of a schema-less dataset according to one embodiment of the present invention.

FIG. 6 shows one example of an RDF dataset 600 to be optimized by the data optimizer 120. As discussed above, the RDF dataset 600 comprises a plurality of triples 602 that include a subject 604, predicate 606, and object 608. The threshold information 128, in this embodiment, is the maximum number of columns allowed in the hashtable by the graph data manager 110 and/or a minimum percentage of the dataset 600 that is to be guaranteed as conflict free. Here, "conflict free" refers co-occurring predicates being assigned to different columns of the hashtable. The optional priority information 130 identifies one or more predicates from the dataset 600 that are to be given priority during the optimization process. For example, a predicate with a higher priority is assigned to a column prior to a predicate with a lower priority. As discussed above, this priority can be determined by the query workload.

The co-occurrence identifier 122 analyzes the dataset 600 to determine/identify predicate co-occurrence sets (also referred to herein as a "key") for each subject to be stored in the hashtable. Stated differently, the co-occurrence identifier 122 identifies the predicates that co-occur for each subject (or object). Predicates co-occur in schema-less data because the data is inherently reflecting a certain semantic about an entity. In addition to identifying the co-occurrence sets, the co-occurrence identifier 122 also maintains a count of each co-occurrence set. This count is used to eliminate infrequently occurring predicate pairs from consideration during the graph coloring process, if the graph generator 126 is unable to assign predicates to columns without exceeding the maximum number of columns value specified by the threshold during the graph coloring process. With respect to the dataset 600 shown in FIG. 6, the co-occurrence identifier 122 determines that predicates <p1> and <p2> co-occur for subject <s1>; predicates <p1>, <p2>, and <p3> co-occur for subject <s2>; and predicates <p4> and <p5> co-occur for subject <s3>. Therefore, the co-occurrence sets (and counts "|y|") for the RDF dataset 600 of FIG. 6 are:

|1| <p1><p2>
|1| <p1><p2><p3>
|1| <p4><p5>

Once the co-occurrence sets are identified, the predicate-pair identifier 124 selects one or more of the co-occurrence sets and determines/identifies all predicate pairs in the selected co-occurrence set. For example, the predicate pairs for the co-occurrence set of <p1> <p2> <p3> are:

<p1><p2>
<p1><p3>
<p2><p3>

It should be noted that if the data optimizer 120 has received priority information 130 as an input, the predicate-pair identifier 124 selects the co-occurrence sets based on this priority information. For example, if predicate <p1> is given top priority over other predicates the predicate-pair identifier 124 first selects the co-occurrence set(s) with predicate pairs comprising <p1>. If multiple co-occurrence sets comprise predicate <p1> the predicate-pair identifier 124 first selects the co-occurrence set(s) with the highest count of predicate pairs comprising <p1>. If priority information 130 is not being used, the predicate-pair identifier 124 can select all co-occurrence sets, select co-occurrence sets comprising a predicate(s) with the highest count, or utilize any other mechanism for determining which co-occurrence sets to select. The predicate pair identifier 124 can also take into account threshold information about the minimum percentage of data to be covered by graph coloring for the dataset. For example, if 90% of the data needs to be covered, the predicate pair identifier 124 can ensure that the predicate pair sets chosen covers at least 90% of the data in the dataset.

Figure 7:
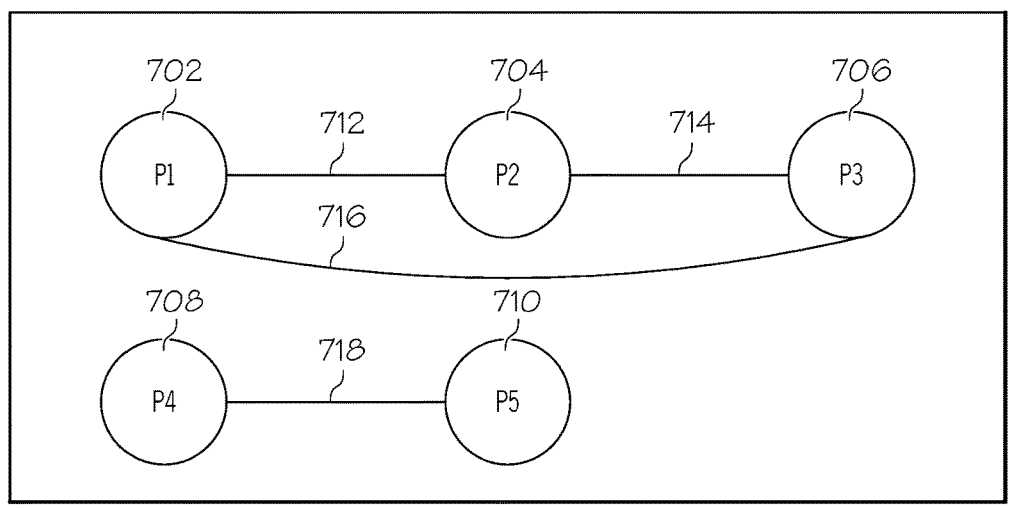
FIG. 7 shows one example of a graph comprising nodes representing co-occurring predicates in the dataset of FIG. 2 and edges placed between predicate pairs according to one embodiment of the present invention.

Once the predicate-pairs have been identified for the selected co-occurrence set(s), the graph generator 126 generates a graph from the predicate pairs and performs a graph coloring process to identify an optimal number of columns for the hashtable and the assignment of predicates to these columns. The generated graph has edges between each predicate pair identified by the predicate pair identifier 124. The graph generator 126 then creates a node 702, 704, 706, 708, 710 in the graph 700 for each predicate in a predicate pair for all predicate pairs of the selected co-occurrence set(s), as shown in FIG. 7. It should be noted that if two or more predicate pairs comprise the same predicate only a single node is created for multiple occurrences of a single predicate. Stated differently nodes are created for unique predicates. The graph generator 126 adds edges 712, 714, 716, 718 between the nodes 702, 704, 706, 708, 710 representing predicates in a pair as shown in FIG. 7. These edges 712, 714, 716, 718 represent interference edges between predicates.

The data optimizer 120 maintains a count of the percentage of the dataset covered by the co-occurrence set added to the graph 700. The data optimizer 120 compares this count against the threshold information 128 to determine if the percentage of the dataset covered by the co-occurrence sets currently in the graph 700 has reached a threshold such as a minimum percentage (e.g., 90%). If the minimum threshold has not been reached additional nodes are added to the graph 700 representing additional predicate pairs using the process discussed above. For example, a subsequent co-occurrence set(s) is selected by the predicate-pair identifier 124 and predicate pairs are identified. The graph generator 126 adds nodes and edges to the graph 700 for each predicate in a predicate pair for all predicate pairs of the subsequently selected co-occurrence set(s). It should be noted that predicate pairs can be identified for all of the co-occurrence sets prior to the minimum threshold comparison process. In this embodiment, the data optimizer 120 only needs to move onto the next set of predicate pairs for the next occurrence set(s) in the ordered list. The count is updated and the minimum threshold comparison process is performed again.

Figures 8, 9:
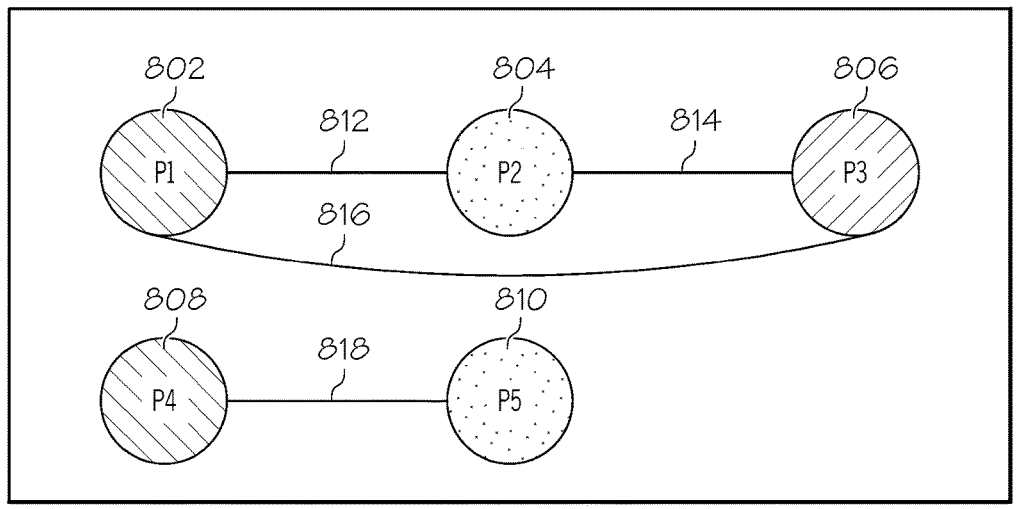
FIG. 8 shows the graph of FIG. 7 with after a graph coloring operation has been performed thereon according to one embodiment of the present invention.
FIG. 9 shows on example of a schema generated based on the graph of FIG. 8 according to one embodiment of the present invention.

If the minimum threshold has been reached (e.g., the minimum percentage of the dataset has been covered), the graph generator 126 stops at that edge size and colors (labels) the graph 700. The graph coloring process assigns labels (colors) to the nodes 702, 704, 706, 708, 710 of the graph 700. Here, a "color" is the column identifier (ID) that is to be assigned to the predicate associated with the node. It should be noted that the graph coloring process, in one embodiment, is performed prior to the minimum threshold comparison process. During the graph coloring process, the graph generator 126 adheres to constraints such as ensuring that no two adjacent nodes share the same color, as shown in FIG. 8. For example, FIG. 8 shows that nodes p1 702, p2 704, and p3 706 have been assigned different colors (as represented by the different line patterns). The graph generator 126 performed this particular column assignment because an edge exists between nodes p1 702 and p2 704, nodes p2 704 and p3 706, and nodes p1 702 and p3 706, which indicates that each of the predicates represented by these nodes is co-occurring. A similar process is performed for nodes p4 708 and p5 710, which represent predicates p4 and p5.

As can be seen in FIG. 8, nodes p4 708 and p5 710 have been colored with different colors than each other, but with similar colors to nodes p1 702 and p2 704, respectively. This is possible because nodes p4 708 and p5 710 do not co-occur (do not have an interference edge) with nodes p1 702 and p2 704, respectively. Therefore, the resulting graph 800 shown in FIG. 8 indicates that predicates p1, p2 and p3 are assigned to different column IDs (and hence columns) while predicate p4 is assigned to the same column ID as predicate p1 and predicate p5 is assigned to the same column ID as predicate p5. It should be noted that various graph coloring heuristics can be utilized by one or more embodiments of the present invention. One non-limiting example of such a heuristic is the Welsh-Powell algorithm, Once the graph has been colored, the data optimizer 120 counts the colors (column IDs) assigned in the graph 400. The data optimizer 120 compares this count to the threshold information 128 to determine whether or not the number of assigned columns is below the maximum number of columns set by the graph data manager 110. If the maximum number of column is greater, the graph generation process is completed and the new schema 900 (i.e., column assignment for the hashtable) is outputted, as shown in FIG. 9. If the current number of assigned columns is above the maximum column threshold, the above process is repeated after removing co-occurrence sets based on certain characteristics (e.g., they are not part of the query workload, they occur infrequently in the data, etc.). As discussed above, the process for removal of predicate pairs, in one embodiment, considers a minimum percentage of data that should remain conflict free during the process of removal.

It should be noted that, in one embodiment, if 100% (or any other specified percentage) of the data is covered then the graph generating process is completed even though the number of columns is below the maximum column threshold. However, if 100% (or any other specified percentage) of the data cannot be covered by the maximum number of columns, the graph generator 126 performs another graph coloring process to generate a second graph for the remaining data while adhering to the thresholds indicated in the threshold information 128.

Once the new schema 900 is outputted, the data optimizer 120 can insert the predicates in the hashtable using this mapping function which maps predicates to columns. This mapping function can be referred to as a new 'hash function' for predicates. The term "hash" is used herein to indicate that there is a mechanism or algorithm for inserting the data into the hashtable. Many different types of hash functions can be used. Examples of various hash functions are given in the co-pending and commonly owned U.S. patent application Ser. No. 12/724,211 entitled "Method and System to Store RDF Data in a Relational Store), which is hereby incorporated by reference in its entirety.

It should be noted that the above discussion also applies to column stores and property table stores. However, instead of storing as many unrelated edge labels as possible into a single column the data optimizer 120 stores as many related edge labels as possible into a single column for a column store and a property table store layout. In a column store, graph data is broken out into separate files by a set of edge labels, with each file representing a set of edge labels. In a property table store, graph data is broken out by an entity's semantic type, such that all entities of the same type, and hence the same set of properties are stored together.

In this embodiment, the data optimizer 120 receives as input a sample of data or a query workload and a given storage layout such as (but not limited to) a column store, property table store, etc. similar to the embodiments discussed above. The data optimizer 120 determines which predicates from the input co-occur, and identifies all predicate pairs in a selected co-occurrence set, as discussed above. The graph generator 126 then generates a graph 700 from the predicate pairs with edges that represent interference edges between predicates, similar to that shown in FIG. 7.

Figures 10, 11:
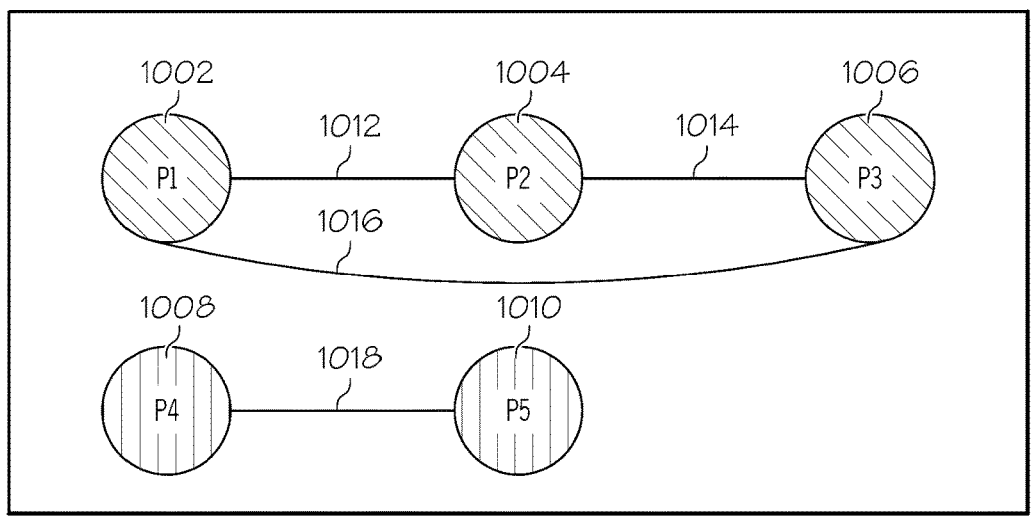
FIG. 10 shows the graph of FIG. 7 after a graph coloring operation has been performed thereon according to another embodiment of the present invention.
FIG. 11 shows one example of a schema generated based on the graph of FIG. 10 according to one embodiment of the present invention.

The graph generator 126 generates an inverse of the graph 700 and performs one or more graph coloring operations on the inverse of graph 700. An inverted graph is generated by adding an edge if two nodes do not share an edge in the original graph, and removing an edge if an edge exists between two nodes. As discussed above, the graph coloring process assigns labels (colors) to the nodes 702, 704, 706, 708, 710 of the graph 700. In this embodiment, the graph generator 126 assigns the same color to each node sharing an interference edge (i.e., co-occurring predicates), as shown in FIG. 10. For example, FIG. 10 shows that nodes p1 1002, p2 1004, and p3 1006 have been assigned the same color (as represented by the same line patterns). The graph generator 126 performed this particular column assignment because an edge exists between nodes p1 1002 and p2 1004, nodes p2 1004 and p3 1006, and nodes p1 1002 and p3 1006, which indicates that each of the predicates represented by these nodes is co-occurring. A similar process is performed for nodes p4 1008 and p5 1010, which represent predicates p4 and p5.

The resulting graph 1000 shown in FIG. 10 indicates that predicates p1, p2, and p3 are assigned to the same column ID (and hence column) while predicates p4 and predicate p5 are assigned to the same column ID, which is different than the column ID assigned to predicates p1, p2, and p3. It should be noted that instead of (or in addition to) generating the inverse of the graph one or more graph partitioning operations can be performed on the graph 700 to create set of graph partitions each comprising a set of the plurality of nodes. The graph coloring operations discussed above can then be performed to assign the same color to each node within a partition, where different colors are assigned across partitions.

Once the graph has been colored, the threshold comparison process discussed above can be optionally performed. When the graph generation process is completed the new schema 1100 (i.e., column assignment for the hashtable) is outputted, as shown in FIG. 11. Once the new schema 1100 is outputted, the data optimizer 120 can insert the predicates in the hashtable using this mapping function which maps predicates to columns, as discussed above.

Operational Flow Diagrams

Figure 12:
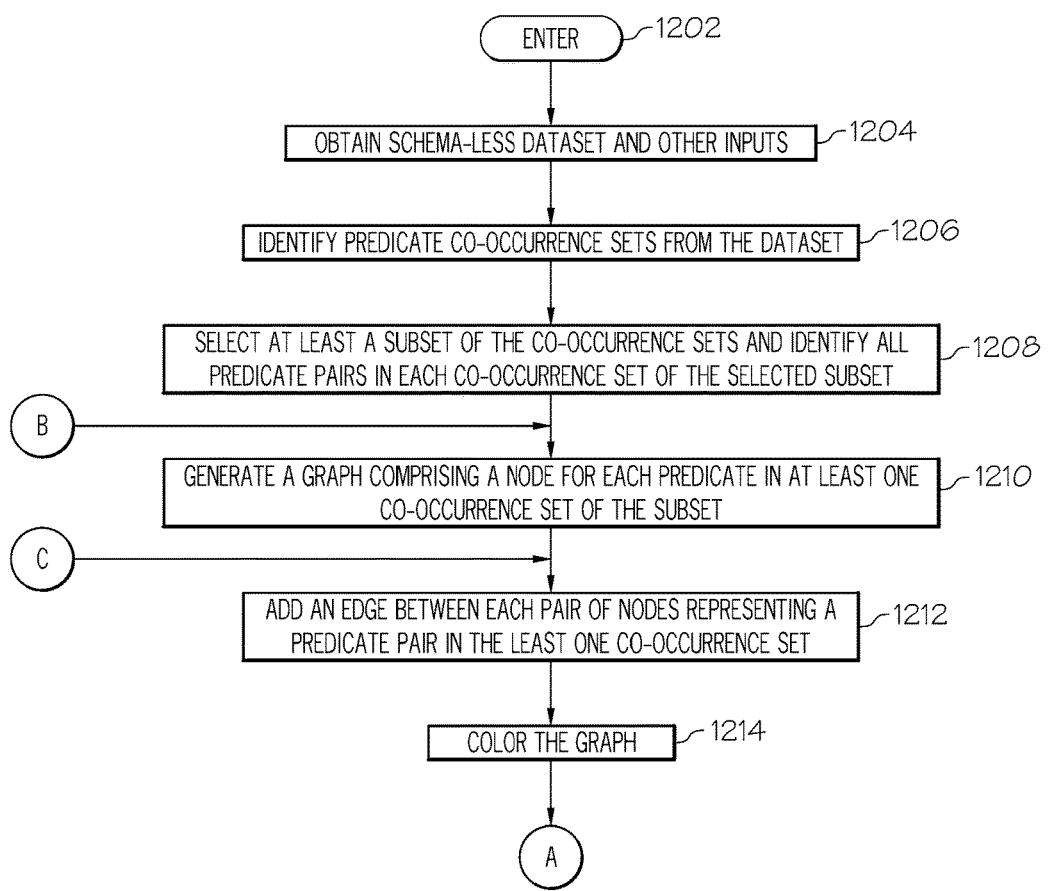
FIGS. 12 and 13 are operational flow diagrams showing an overall process of optimizing schema-less data for storage in a data storage system according to one embodiment of the present invention.
Figure 13:
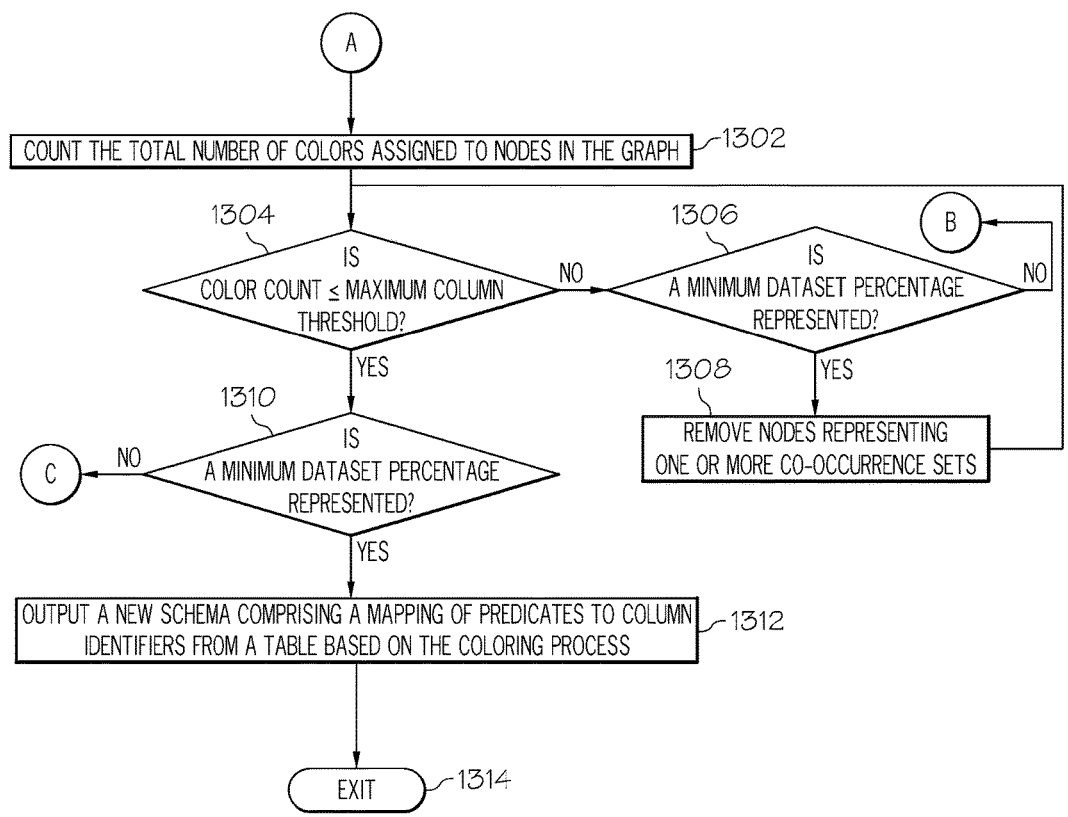

FIGS. 12 and 13 are operational flow diagrams illustrating one overview of optimizing a schema-less dataset for storage in a data storage system. It should be noted that a more detailed discussion with respect each of the steps shown in FIGS. 12 and 13 has already been given above with respect to FIGS. 1-9. The operational flow of FIG. 12 starts at step 1202 and flows directly into step 1204. The data optimizer 120, at step 1204, obtains schema-less data set 200, threshold information 128, and optional priority information 130 as inputs. The data optimizer 120, at step 1206, identifies predicate co-occurrence sets from the dataset 600. The data optimizer 120, at step 1208, selects at least a subset of the co-occurrence sets and identifies all predicate pairs in each co-occurrence set of the selected subset. For example, co-occurrence sets can be selected for (or filtered from) optimization based on characteristics such as, but not limited to, predicate priority, query workload inclusion, frequency or occurrence in the dataset, etc. The data optimizer 120, at step 1210, generates a graph comprising a node for each predicate in at least one co-occurrence set of the selected subset. The data optimizer 120, at step 1212, adds an edge between each pair of nodes representing a predicate pair in the at least one co-occurrence set. The data optimizer 120, at step 1214, performs a graph coloring process to assign a color (column ID) to each node such that two nodes with adjacent inference edges are not assigned the same color. The control then flows to entry point A of FIG. 13.

The data optimizer 120, at step 1302, counts the number of colors (column IDs) currently assigned in the graph and compares this count to a maximum column threshold. The data optimizer 120, at step 1304, determines if the count is less than or equal to the maximum column threshold. If the result of this determination is negative (the count is greater than the maximum column threshold), the data optimizer 120, at step 1306, determines if a minimum percentage of the dataset (designated to be conflict free) is represented by the nodes currently in the graph. If the result of this determination is negative, the control flows to entry point B of FIG. 12, where a second graph is created for the remaining portion of the dataset such that at least the minimum percentage of the dataset is reached. If the result of the determination at step 1306 is positive, the data optimizer 120, at step 1308, removes one or more nodes, which represent predicates of at least one co-occurrence set of the selected subset, from the graph. The control flow then returns to step 1304. If the result of the determination at step 1304 is positive, the data optimizer 120, at step 1310, determines if a minimum percentage of the dataset (designated to be conflict free) is represented by the nodes currently in the graph. If the result of this determination is negative, the control flows to entry point C of FIG. 12, where additional nodes are added to the graph for at least one co-occurrence set. If the result of this determination is positive, the data optimizer 120, at step 1312, outputs a new schema that maps column identifiers from a table to each predicate represented by a node in the graph based on the colors assigned to the nodes. The control flow then exits at step 1314.

Figure 14:
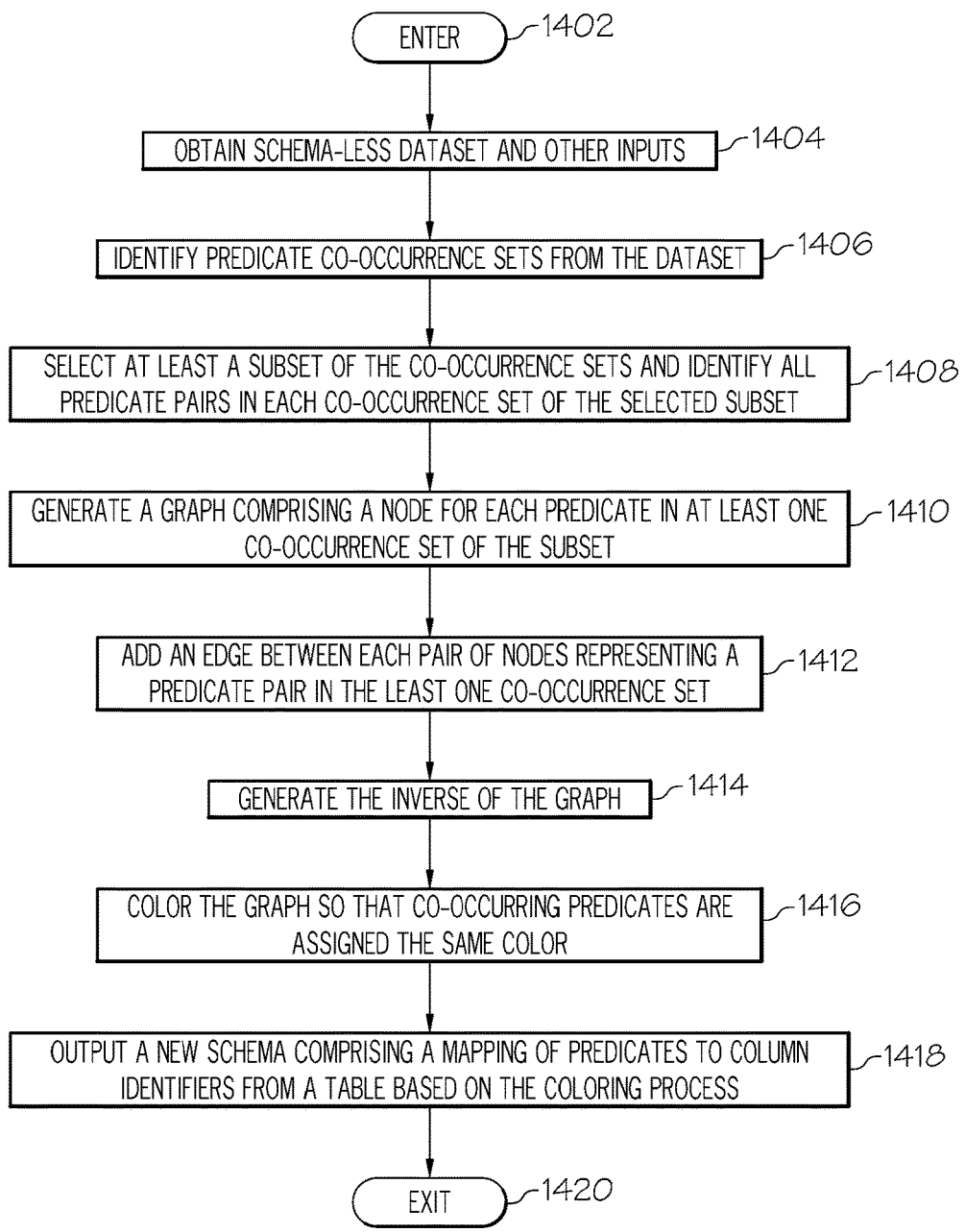
FIG. 14 is an operational flow diagrams showing another example of an overall process of optimizing schema-less data for storage in a data storage system according to another embodiment of the present invention.

FIG. 14 is an operational flow diagram illustrating another example of optimizing a schema-less dataset for storage in a data storage system. The operational flow of FIG. 14 starts at step 1402 and flows directly into step 1404. The data optimizer 120, at step 1404, obtains schema-less data set 200, threshold information 128, and optional priority information 130 as inputs. The data optimizer 120, at step 1406, identifies predicate co-occurrence sets from the dataset 600. The data optimizer 120, at step 1408, selects at least a subset of the co-occurrence sets and identifies all predicate pairs in each co-occurrence set of the selected subset. For example, co-occurrence sets can be selected for (or filtered from) optimization based on characteristics such as, but not limited to, predicate priority, query workload inclusion, frequency or occurrence in the dataset, etc.

The data optimizer 120, at step 1410, generates a graph comprising a node for each predicate in at least one co-occurrence set of the selected subset. The data optimizer 120, at step 1412, adds an edge between each pair of nodes representing a predicate pair in the at least one co-occurrence set. The data optimizer 120, at step 1414, generates the inverse of the graph. The data optimizer 120, at step 1416, performs a graph coloring process to assign a color (column ID) to each node such that two nodes with adjacent inference edges are assigned the same color. The data optimizer 120, at step 1418, outputs a new schema that maps column identifiers from a table to each predicate represented by a node in the graph based on the colors assigned to the nodes. The control flow then exits at step 1420.

Information Processing System

Figure 15:
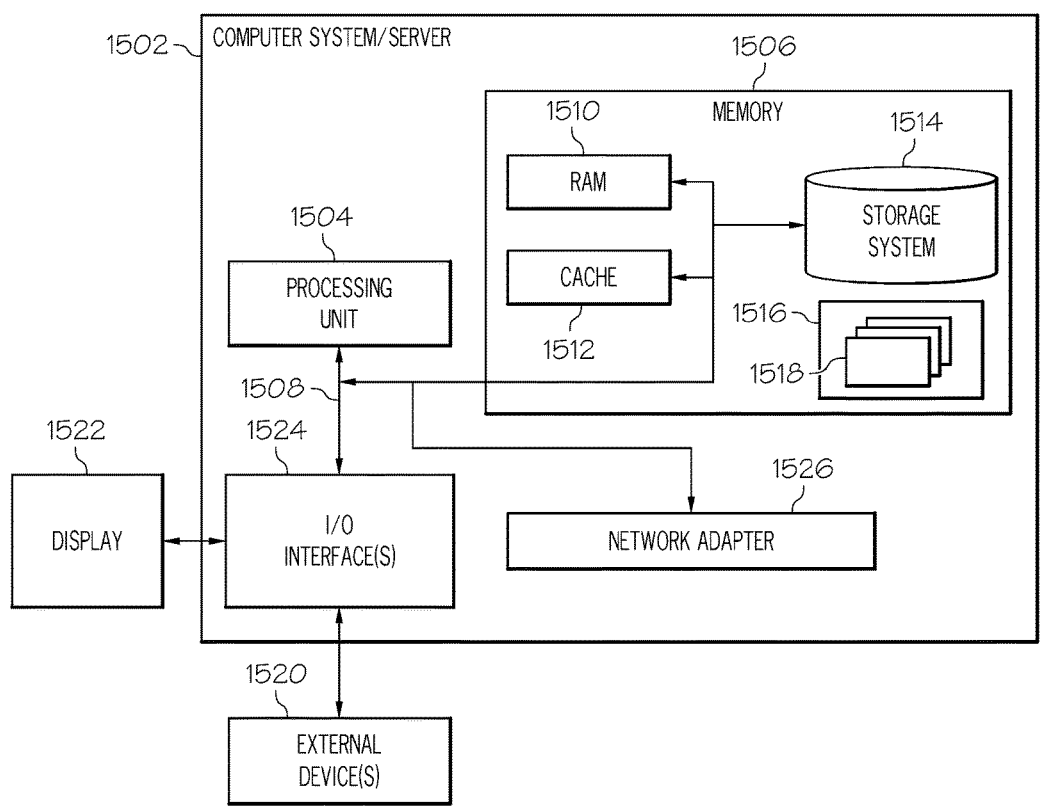
FIG. 15 is a block diagram illustrating a detailed view of an information processing system according to one embodiment of the present invention.

FIG. 15 shows a schematic of an exemplary information processing system 1502 for use in embodiments of the present invention. Information processing system 1502 is only one example of a suitable system and is not intended to limit the scope of use or functionality of embodiments of the present invention described above. The exemplary information processing system 1502 is capable of implementing and/or performing any of the functionality set forth above. The information processing system 1502 can be an information system communicatively coupled to a wireless communications network, a personal computer system, a server computer system, a thin client, a thick client, a hand-held or laptop device, a tablet computing device, a multiprocessor system, a microprocessor-based system, a set top box, a programmable consumer electronic, a network PC, a minicomputer system, a mainframe computer system, a distributed cloud computing system, or the like.

As illustrated in FIG. 15, the information processing system 1502 is in the form of a general-purpose computing device. The components of the information processing system 1502 can include, but are not limited to, one or more processors or processing units 1504, a system memory 1506, and a bus 1508 that couples various system components including the system memory 1506 to the processor 1504. The bus 1508 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The information processing system 1502 typically includes a variety of computer system readable media. Such media may be any available media that is accessible by the information processing system 1502, and it includes both volatile and non-volatile media, removable and non-removable media. Although not shown, the system memory 1506 can include the graph data manager 110, the data optimizer 120 and its components, the threshold information 128 and the priority information 130. In another embodiment, the graph data manager 110 and its components can reside within the processor 1504, or be a separate hardware component. The system memory 1506 can also include computer system readable media in the form of volatile memory, such as random access memory (RAM) 1510 and/or cache memory 1512. The information processing system 1502 can further include other removable/non-removable, volatile/non-volatile computer system storage media. By way of example only, a storage system 1514 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 1508 by one or more data media interfaces. The memory 1506 can include at least one program product having a set of program modules that are configured to carry out the functions of an embodiment of the present invention.

Program/utility 1516, having a set of program modules 1518, may be stored in memory 1506 by way of example, and not limitation, as well as an operating system, one or more application programs, other program modules, and program data. Each of the operating system, one or more application programs, other program modules, and program data or some combination thereof, may include an implementation of a networking environment. Program modules 1518 generally carry out the functions and/or methodologies of embodiments of the present invention.

The information processing system 1502 can also communicate with one or more external devices 1520 such as a keyboard, a pointing device, a display 1522, etc.; one or more devices that enable a user to interact with the information processing system 1502; and/or any devices (e.g., network card, modem, etc.) that enable computer system/server 1502 to communicate with one or more other computing devices. Such communication can occur via I/O interfaces 1524. Still yet, the information processing system 1502 can communicate with one or more networks such as a local area network (LAN), a general wide area network (WAN), and/or a public network (e.g., the Internet) via network adapter 1526. As depicted, the network adapter 1526 communicates with the other components of information processing system 1502 via the bus 1508. Other hardware and/or software components can also be used in conjunction with the information processing system 1502. Examples include, but are not limited to: microcode, device drivers, redundant processing units, external disk drive arrays, RAID systems, tape drives, and data archival storage systems.

Non-Limiting Examples

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments above were chosen and described in order to best explain the principles of the invention and the practical application, and to enable others of ordinary skill in the art to understand the invention for various embodiments with various modifications as are suited to the particular use contemplated.

What is claimed is:

1. A method for optimizing storage of schema-less data in a data storage system, the method comprising:

receiving, by a server computer via a network, at least one of a schema-less dataset comprising a plurality of resources and at least one query workload associated with the plurality of resources, wherein each resource in the plurality of resources is associated with at least a plurality of properties;

identifying, by the server computer, one or more of the plurality of resources, at least one set of co-occurring properties from the plurality of properties;

generating, by the server computer, a graph comprising a plurality of nodes, wherein each node of the plurality of nodes represents a unique property in the at least one set of co-occurring properties, and wherein the graph further comprises an edge connecting each node of the plurality of nodes representing a pair of co-occurring properties in the at least one set of co-occurring properties;

generating, by a data optimizer executed on the server computer, based on the graph, a storage schema, wherein the storage schema assigns a column identifier to each unique property represented by one of the plurality of nodes in the graph, where each node of the plurality of nodes connected by an edge is assigned the same column identifier; and wherein the generating the storage schema comprises:

generating, by the data optimizer executed on the server computer, an inverse of the graph, performing, by the data optimizer executed on the server computer, a graph coloring operation on the inverse of the graph, wherein the graph coloring operation comprises assigning each node of the plurality of nodes to a color, wherein nodes connected by an edge are assigned same colors, and wherein a color represents a column identifier, determining, by the data optimizer executed on the server computer, a total number of colors assigned to the plurality of nodes in the graph, comparing, by the data optimizer executed on the server computer, the total number of colors to a first threshold identifying a maximum number of columns for a table, determining, by the data optimizer executed on the server computer, if the total number of colors is greater than the first threshold, and removing, based on the total number of colors being greater than the first threshold, nodes associated with the at least one set of co-occurring properties from the graph until a percentage of the dataset represented by all nodes in the graph at least one of satisfies a second threshold identifying a minimum percentage of the schema-less dataset to be conflict free and satisfies the first threshold;

outputting, by the data optimizer executed on the server computer, a new schema that maps column identifiers to each predicate represented by a node in the graph based on the colors assigned to the nodes; and storing, by the server computer, in a memory, for each source of the one or more resources, each property of one or more of properties of the plurality of properties into a column of the able based on the column identifiers associated with the storage schema, wherein a number of columns provided in the table is determined based on the storage schema.

2. The method of claim 1 further comprising: generating, based on the total number of colors being equal to the first threshold, at least one additional graph comprising nodes representing unique properties in at least one additional set of co-occurring properties.

3. The method of claim 1, wherein generating the storage schema further comprises: partitioning the graph into a set of partitions, wherein each partition of the set of partitions comprises a set of the plurality of nodes; and performing a graph coloring operation on each partition of the set of partitions, wherein the graph coloring operation comprises assigning each node in the set of plurality of nodes in each partition of the set of partitions same color, and wherein a color represents a column identifier from the table.

4. The method of claim 1, wherein the table resides within a column store.

5. The method of claim 1, wherein the table resides within a property table store.

6. The method of claim 1, wherein the schema-less dataset is in a Resource Description Framework triple format, and wherein the plurality of resources is represented as a plurality of subjects and the plurality of properties is represented as a plurality of predicates.

7. The method of claim 1, wherein generating the graph further comprises: identifying a first property in the at least one set of co-occurring properties that is associated with a higher priority than a second property in the at least one set of co-occurring properties; and adding a node to the graph representing the first property prior to adding a node to the graph representing the second property.

8. An information processing system for optimizing storage of schema-less data in a data storage system, the information processing system comprising:

a memory;

a processor communicatively coupled to the memory; and a data optimizer communicatively coupled to the memory and the processor, wherein the data optimizer is executed by the processor to perform a method comprising:

receiving via a network at least one of
a schema-less dataset comprising a plurality of resources, and
at least one query workload associated with the plurality of resources, wherein each resource in the plurality of resources is associated with at least a plurality of properties;

identifying, for one or more of the plurality of resources, at least one set of co-occurring properties from the plurality of properties;

generating a graph comprising a plurality of nodes, wherein each node of the plurality of nodes represents a unique property in the at least one set of co-occurring properties, and wherein the graph further comprises an edge connecting each node of the plurality of nodes representing a pair of co-occurring properties in the at least one set of co-occurring properties;

generating, based on the graph, a storage schema, wherein the storage schema assigns a column identifier to each unique property represented by one of the plurality of nodes in the graph, where each node of the plurality of nodes connected by an edge is assigned the same column identifier, wherein generating the storage schema comprises
generating an inverse of the graph,
performing a graph coloring operation on the inverse of the graph, wherein the graph coloring operation comprises assigning each node of the plurality of nodes to a color, wherein nodes connected by an edge are assigned same colors, and wherein a color represents a column identifier, determining a total number of colors assigned to the plurality of nodes in the graph, comparing the total number of colors to a first threshold identifying a maximum number of columns for a table, determining if the total number of colors is greater than the first threshold, and removing, based on the total number of colors being greater than the first threshold, nodes associated with the at least one set of co-occurring properties from the graph until a percentage of the dataset represented by all nodes in the graph at least one of satisfies a second threshold identifying a minimum percentage of the schema-less dataset to be conflict free and satisfies the first threshold;

outputting a new schema that maps column identifiers to each predicate represented by a node in the graph based on the colors assigned to the nodes; and storing in the memory, for each source of the one or more resources, each property of one or more of properties of the plurality of properties into a column of the table based on the column identifiers associated with the storage schema, wherein a number of columns provided in the table is determined based on the storage schema.

9. The information processing system of claim 8, wherein the method further comprises: generating, based on the total number of colors being equal to the first threshold, at least one additional graph comprising nodes representing unique properties in at least one additional set of co-occurring properties.

10. The information processing system of claim 8, wherein generating the storage schema further comprises: partitioning the graph into a set of partitions, wherein each partition of the set of partitions comprises a set of the plurality of nodes; performing a graph coloring operation on each partition of the set of partitions, wherein the graph coloring operation comprises assigning each node in the set of plurality of nodes in each partition of the set of partitions same color, and wherein a color represents a column identifier from the table.

11. The information processing system of claim 8, wherein the schema-less dataset is in a Resource Description Framework triple format, and wherein the plurality of resources is represented as a plurality of subjects and the plurality of properties is represented as a plurality of predicates.

12. The information processing system of claim 8, wherein generating the graph further comprises: identifying a first property in the at least one set of co-occurring properties that is associated with a higher priority than a second property in the at least one set of co-occurring properties; and adding a node to the graph representing the first property prior to adding a node to the graph representing the second property.

13. A computer program product for optimizing storage of schema-less data in a data storage system, the computer program product comprising: a non-transitory storage medium readable by a processing circuit and storing instructions for execution by the processing circuit for performing a method comprising:

receiving, by a server computer via a network, at least one of a schema-less dataset comprising a plurality of resources and at least one query workload associated with the plurality of resources, wherein each resource in the plurality of resources is associated with at least a plurality of properties;

identifying, by the server computer, for one or more of the plurality of resources, at least one set of co-occurring properties from the plurality of properties;

generating, by the server computer, a graph comprising a plurality of nodes, wherein each node of the plurality of nodes represents a unique property in the at least one set of co-occurring properties, and wherein the graph further comprises an edge connecting each node of the plurality of nodes representing a pair of co-occurring properties in the at least one set of co-occurring properties;

generating, by a data optimizer executed on the server computer, based on the graph, a storage schema, wherein the storage schema assigns a column identifier to each unique property represented by one of the plurality of nodes in the graph, where each node of the plurality of nodes connected by an edge is assigned the same column identifier; and wherein the generating the storage schema comprises:

generating, by the data optimizer executed on the server computer, an inverse of the graph, performing, by the data optimizer executed on the server computer, a graph coloring operation on the inverse of the graph, wherein the graph coloring operation comprises assigning each node of the plurality of nodes to a color, wherein nodes connected by an edge are assigned same colors, and wherein the color represents a column identifier, determining, by the data optimizer executed on the server computer, a total number of colors assigned to the plurality of nodes in the graph, comparing the total number of colors to a first threshold identifying a maximum number of columns for a table, determining if the total number of colors is greater than the first threshold, and removing, based on the total number of colors being greater than the first threshold, nodes associated with the at least one set of co-occurring properties from the graph until a percentage of the dataset represented by all nodes in the graph at least one of satisfies a second threshold identifying a minimum percentage of the schema-less dataset to be conflict free and satisfies the first threshold;

outputting, by the data optimizer executed on the server computer, a new schema that maps column identifiers to each predicate represented by a node in the graph based on the colors assigned to the nodes; and storing, by the server computer, in a memory, for each source of the one or more resources, each property of one or more of properties of the plurality of properties into a column of the table based on the column identifiers associated with the storage schema, wherein a number of columns provided in the table is determined based on the storage schema.

14. The computer program product of claim 13, wherein the method further comprises generating, based on the total number of colors being equal to the first threshold, at least one additional graph comprising nodes representing unique properties in at least one additional set of co-occurring properties.

15. The computer program product of claim 13, wherein generating the storage schema further comprises: partitioning the graph into a set of partitions, wherein each partition of the set of partitions comprises a set of the plurality of nodes; and performing a graph coloring operation on each partition of the set of partitions, wherein the graph coloring operation comprises assigning each node in the set of plurality of nodes in one partition of the set of partitions same color, and wherein a color represents a column identifier from the table.

16. The computer program product of claim 13, wherein the table resides within a column store.

17. The computer program product of claim 13, wherein the table resides within a property table store.

18. The computer program product of claim 13, wherein the schema-less dataset is in a Resource Description Framework triple format, and wherein the plurality of resources is represented as a plurality of subjects and the plurality of properties is represented as a plurality of predicates.

19. The computer program product of claim 13, wherein generating the graph further comprises: identifying a first property in the at least one set of co-occurring properties that is associated with a higher priority than a second property in the at least one set of co-occurring properties; and adding a node to the graph representing the first property prior to adding a node to the graph representing the second property.

* * * * *